2 Sheets, Sheet 1.

Terry, Terry Jr. & Robeson,

Box Machine

No. 3985. Reissued May 17, 1870.

Witnesses:

Chas. Artos

Baltis De Long

S. B. Terry
S. B. Terry Jr.
D. S. Robeson
By their atty
W. H. Baldwin

2. Sheets, Sheet 2.

Terry, Terry, Jr. & Robeson.

Box Machine.

No. 3985 Reissued May 17. 1870.

Witnesses:

Fred. Artos

Baltis & Long.

S. B. Terry
S. B. Terry Jr
D. S. Robeson
By their Atty
Wm. H. Baldwin

United States Patent Office.

SILAS B. TERRY, JR., OF WATERBURY, CONNECTICUT, AND DANIEL S. ROBESON, OF PHILADELPHIA, PENNSYLVANIA, ASSIGNEES, BY MESNE ASSIGNMENTS, OF SILAS B. TERRY.

*Letters Patent No.* 25,373, *dated September* 6, 1859; *reissue No.* 3,985, *dated May* 17, 1870.

IMPROVEMENT IN MACHINES FOR MAKING PAPER BOXES.

The Schedule referred to in these Letters Patent and making part of the same.

*To all whom it may concern:*

Be it known that SILAS B. TERRY, formerly of Terrysville, in the county of Litchfield and State of Connecticut, but now of Waterbury, in the county of New Haven and State aforesaid, has invented a new and useful Machine for Making Paper Boxes, of which the following is a full, clear, and exact description, reference being had to the accompanying drawings, in which—

Figure 1 is a view in perspective of the said machine;

Figure 2, a vertical transverse section through the same at the line *x x* of fig. 1;

Figure 3, a vertical longitudinal section at the line *y y* of fig. 2, showing the relative position of the socket, mandrel, guide-ring, pressure-roller, and clamp while forming the box;

Figure 4, a similar section, showing the position of some of said parts when moved away from the pressure-roller;

Figure 5, a view in perspective of an apparatus for folding the side strips of the box;

Figure 6, a vertical transverse section through the same, showing the position of the parts before the strip is folded;

Figure 7, a similar view after the strip is folded;

Figure 9:
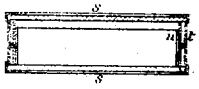
Figure 9 is a vertical section through the finished box, showing the projecting ends.

The machine is designed to manufacture paper-boxes and lids for the same, the bottom of the box and the top of the lid being of greater diameter than the body of either, or, in other words, the bottom and the top projecting beyond the periphery of the box, and forming what is known to the trade as a French edge, as shown in fig. 9, and, to attain this end, My invention consists—

First, in providing means for adjusting and retaining, in its proper relation to the operative mechanism, the disk of paper which constitutes the head or end of the box.

Second, in providing means for applying to the disk of paper the strips which form the side or body of the box.

Third, in providing means for uniting the strips and the disk, so as to form the box.

Fourth, in providing means to insure the accurate and symmetrical union of the strips and disk.

Fifth, in providing means for discharging the finished box.

The mechanism is mounted on a strong frame or bed-plate, A.

A shaft, B, mounted in uprights $B^1$ $B^2$, is provided at its outer end with a crank, *b*, by which to turn it, and at its inner end with a clamp, C, having spurs *c*, projecting from its face, to insure its turning the disk or end of the box, as hereinafter more fully explained.

Figure 3:
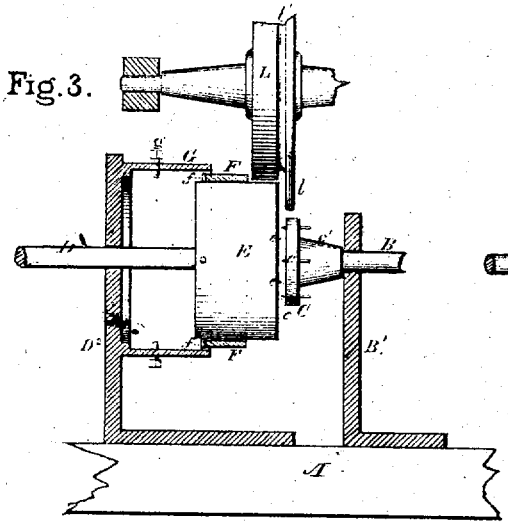

The shaft B is capable not only of turning freely, but also of sliding endwise in its bearings, its backward movement being limited by the boss *c'*, fig. 3, which abuts against the bearing $B^1$, and acts as a stop to the endwise movement of the clamp C.

A shaft, D, is mounted in bearings $D^1$ $D^2$, so as to rotate freely, and also to move endwise therein toward or from the clamp C, the shafts D and B being in the same axial plane.

A mandrel, E, is mounted on the inner end of the shaft D, with which it revolves, and spurs *e* are provided on its face for a purpose similar to that of the spurs on the face of the clamp C.

Pins *f*, toward the rear of the mandrel E, act as stops to prevent a ring, F, which moves freely on the mandrel, from slipping off the outer or rear end of the mandrel.

This mandrel slides endwise, and turns freely within a cylindrical socket or casing, G, fixed to the bearing $D^2$.

Studs *g*, projecting inward through this casing, serve as stops to the backward movement of the ring F, within the casing, but permit the mandrel to be withdrawn further back than the ring, and the finished box is thus pressed off from the mandrel by the ring, as the mandrel is withdrawn past the studs *g*.

Figure 1:
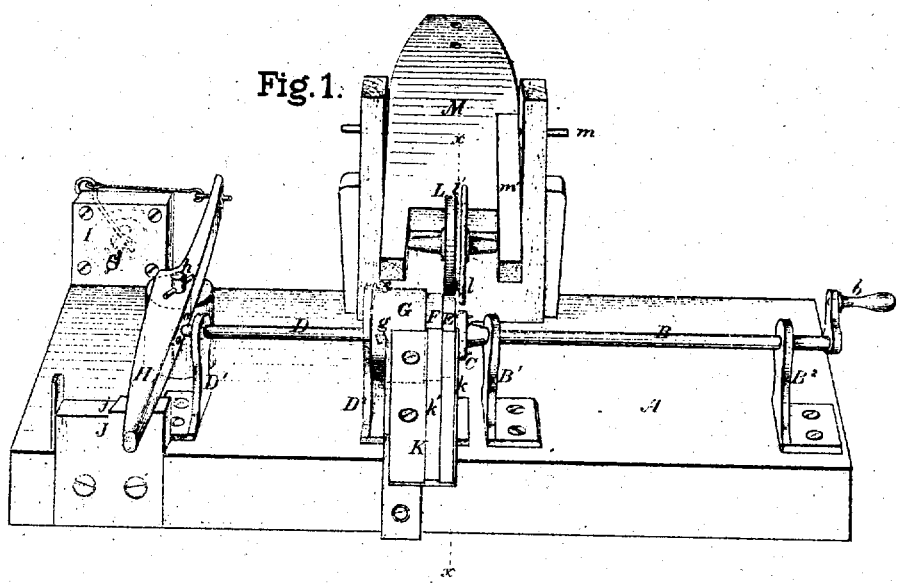
Figure 2:
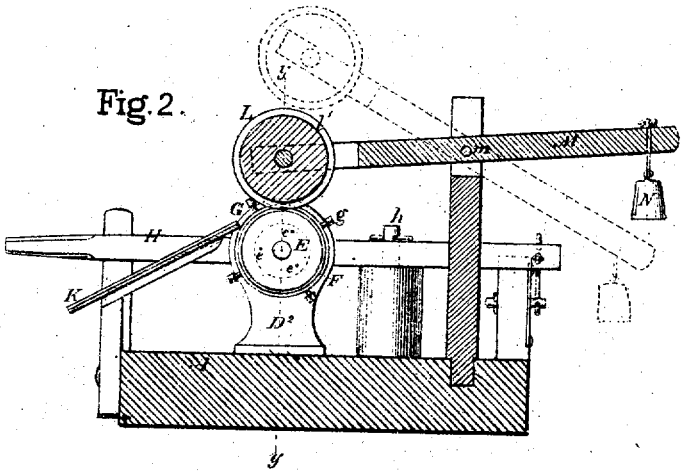

A lever, H, rocking on a fulcrum, *h*, is secured at one end to a tension spring, I, shown in dotted lines in fig. 1, the tendency of which spring is always to keep the free or rear end of the lever pressed against the end of the shaft D, and thus keep the mandrel close to the clamp C.

This lever slides over a rail or way, J, having a notch, *j*, in it, which serves to hold the lever out of contact with the shaft D, so as to permit the mandrel to be retracted within the casing G.

An inclined plate, K, is secured upon the frame in front of the casing G, and is provided at its inner edge with a flange, *k*, and also with a ledge, *k'*, arranged parallel to the flange *k*, and projecting across the face of the mandrel when in operation, so as to bear upon the strip on the mandrel with its face, while its edge smooths the strip upon the projecting edge of the disk on the side opposite the flange in the pressure-roller, thus forming a groove or guide-way for the strip which binds the edges of the side and head of the box together.

A grooved pressure-roller or shaping chuck, L, is mounted in bearings in a rocking-bar, M, vibrating vertically on a pivot, *m*, and counterbalanced at its outer end by a weight, N.

One of the bearings, *m'*, is removable, so as to permit chucks of different sizes to be substituted for L.

The pressure-roller or chuck L is thus mounted directly over the point of contact of the clamp C and the mandrel E, the flange *l* on the roller overlapping the mandrel, and a groove, *l'*, is formed in the periphery of the roller L, next the flange, in the same vertical plane as the face of the mandrel when in operation.

Figure 6:
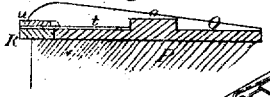
Figure 5:
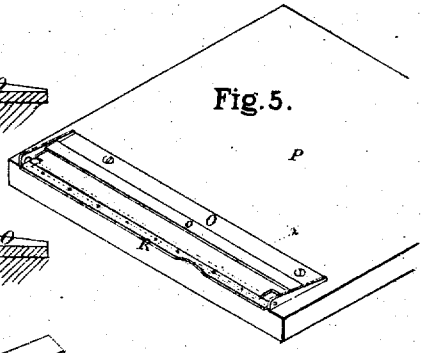
Figure 7:
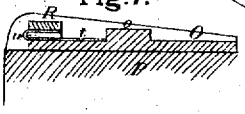

Figs. 5, 6, and 7, show an apparatus for folding one strip of paper over another, to form the sides of a box.

A metal plate, O, is secured to a proper base or bed, P, parallel with its edge.

A rib, *o*, on the plate serves as a guide for the strip of paper, as hereinafter described.

A folding-bar, R, is hinged to the front edge of the plates by pivots *r*, so arranged as to permit the bar to be folded over upon the plate.

Figure 8:
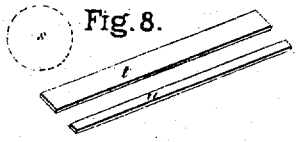
Figure 8 shows the form of the pieces which compose the box.

The operation of the machine in making a French-edge box is as follows:

Circular disks *s*, fig. 8, of paper, suitable for the heads or ends of the boxes, and of a size conformable to that of the box to be made, are cut out by well-known mechanism, which need not be here described, as it forms no part of this invention.

Narrow strips, *u*, fig. 8, of comparatively thick paper, for that portion of the sides of the boxes which forms a flange, are likewise cut out in any well-known way, as also are wider strips *t*, fig. 8, to form the overlapping sections of the box.

Provided with these parts *s t u*, the operator using this machine throws the lever H into the notch *j*, raises the pressure-roller L, draws the mandrel E back into its socket G, and also draws back the clamp C in its bearings, thus leaving an opening between the mandrel and the clamp.

He then presses a disk, *s*, of the paper, onto the face of the mandrel E, and into the socket or casing G, which is of a conformable size, and where it is necessarily thus adjusted in its proper position relatively to the clamp C. The clamp C is then pushed up against the disk *s*, which is now firmly held between the spurs *c* on the clamp, and those on the mandrel.

Figure 4:
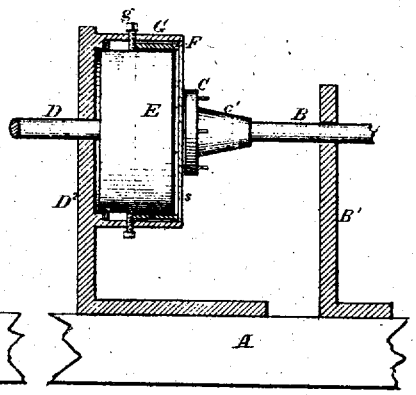

Fig. 4 represents this stage of the operation.

The lever H is now released from the notch *j*, and forces the mandrel forward until it comes under the pressure-roller L.

Fig. 3 represents this stage of the operation, in which it will be observed that the boss *c'* abuts against the bearing B', and holds the disk *s* just below the groove *l'* of the pressure-roller L, the ring F having been pushed back by the operator against the stop *f*, which position it serves as a gauge for the width of the side strip *t*.

These side strips may be prepared as follows:

A wide strip, *t*, is laid on the plate O, with its edge abutting against the rib *o*, which acts as a gauge. The strip is then pasted on its upper side, and a strip, *u*, is then placed on it, directly over the bar R, as in fig. 6, which is then turned over, as in fig. 7, the effect of which is to inclose the strip *u*, within one side the strip *t*, which projects beyond it on one side, and thus form a flange or thickening for that portion of the side of the box which is to come next the head or end.

The strip thus prepared is placed in the guide K, with its pasted side down, its thick edge thus bearing against the ring F, while its thin edge, which is toward the flange of the roller L, projects over the disk *s*, and its inner end touches the disk. The operator then bears on the bar M to press the roller L down on the mandrel, and turns the crank *b*.

As the mandrel is thus rotated by the clamp C, the projecting thin edge of the strip is drawn between the mandrel and the roller, over the edge of the disk *s*, which turns in the groove in the roller L, the edge of the flange *k* smoothing the strip upon the side of the disk next to it, as hereinbefore described, and the edge of the strip is turned over and smoothed down upon the disk by the flange *l*.

The clamp C being smaller than the disk, allows the edge of the strip to be thus turned over and smoothed down on the face of the disk by the flange of the pressure-roller.

The strip *t u* being somewhat longer than the circumference of the mandrel, its overlapping end is at the same time closed and smoothed down by the face of the roller L, and thus the side and end of the box are simultaneously formed in one or two revolutions of the mandrel.

When this operation is completed, the lever H is again thrown back into the notch *j*, and the mandrel retracted into its socket, carrying the box with it until the ring F abuts against the stop *g*, and forces the box from the mandrel, the clamp C remaining in its original position, and the box falls into a suitable receptacle.

What we claim as the invention of the said SILAS B. TERRY, is—

1. The combination, in a machine for making paper boxes, of a mandrel and a clamp rotating together, and carrying the disk of paper, substantially as described.

2. The combination, in a machine for making paper boxes, of a rotating clamp, a mandrel rotating with the clamp, and a flanged and grooved pressure-roller, substantially as described.

3. The combination, with the mandrel and the clamp, of the pressure-lever, substantially as described.

4. The combination, with the mandrel, of the guide-ring F, substantially as and for the purposes described.

5. The combination, with the mandrel of a socket in which the paper disk is adjusted upon the mandrel, substantially as described.

6. The combination, with the mandrel, the socket, and the guide-ring, of stops on the mandrel and in the socket, substantially as and for the purpose described.

7. The combination, with the clamp, the mandrel, the guide-ring, and the flanged and grooved pressure-roller, of a guide-way for the strip, substantially as described.

8. The pressure-roller, having a groove for the projecting edge of the paper disk, a flange to turn and smooth the projecting edge of the strip upon the disk, and a bearing-surface to close and smooth the strip, substantially as described.

SILAS B. TERRY.
SILAS B. TERRY, JR.
DAN. S. ROBESON.

Witnesses as to SILAS B. TERRY and SILAS B. TERRY, JR.:
HENRY TERRY,
E. W. SMITH.

Witnesses as to D. S. ROBESON:
WM. B. DAYTON,
J. SNOWDEN BELL.